(12) United States Patent
Lawrenson et al.

(10) Patent No.: US 10,497,127 B2
(45) Date of Patent: Dec. 3, 2019

(54) MODEL-BASED SEGMENTATION OF AN ANATOMICAL STRUCTURE

(71) Applicant: KONINKLIJKE PHILIPS N.V., Eindhoven (NL)

(72) Inventors: Matthew John Lawrenson, Bussigny-pres-de-lausanne (CH); Julian Charles Nolan, Pully (CH); Juergen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/563,996

(22) PCT Filed: Apr. 19, 2016

(86) PCT No.: PCT/EP2016/058595
§ 371 (c)(1),
(2) Date: Oct. 3, 2017

(87) PCT Pub. No.: WO2016/169903
PCT Pub. Date: Oct. 27, 2016

(65) Prior Publication Data
US 2018/0137626 A1     May 17, 2018

(30) Foreign Application Priority Data
Apr. 23, 2015   (EP) .................................... 15164754

(51) Int. Cl.
*G06T 7/149*     (2017.01)
*G06T 7/00*      (2017.01)
(Continued)

(52) U.S. Cl.
CPC ............ *G06T 7/149* (2017.01); *G06K 9/6204* (2013.01); *G06K 9/6254* (2013.01);
(Continued)

(58) Field of Classification Search
CPC ......... G06T 7/149; G06T 7/0012; G06T 7/12; G06T 2210/41; G06T 2200/04;
(Continued)

(56) References Cited

U.S. PATENT DOCUMENTS 7,796,790 B2   9/2010   McNutt et al.
8,620,040 B2   12/2013  Grosskopf et al.
(Continued)

OTHER PUBLICATIONS

Ecabert, O. et al., "Automatic Model-based Segmentation of the Heart in CT Images", IEEE Transactions on Medical imaging 2008, 27(9), 1189-1201.
(Continued)

*Primary Examiner* — Bobbak Safaipour

(57) ABSTRACT

A system and method are provided for segmentation of an anatomical structure in which a user may interactively specify a limited set of boundary points of the anatomical structure in a view of a medical image. The set of boundary points may, on its own, be considered an insufficient segmentation of the anatomical structure in the medical image, but is rather used to select a segmentation model from a plurality of different segmentation models. The selection is based on a goodness-of-fit measure between the boundary points and each of the segmentation models. For example, a best-fitting model may be selected and used for segmentation of the anatomical structure. It is therefore not needed for the user to delineate the entire anatomical structure, which would be time consuming and ultimately error prone, nor is it needed for a segmentation algorithm to autonomously have to select a segmentation model, which may yield an erroneous selection.

13 Claims, 5 Drawing Sheets

(51) Int. Cl.
*G06T 7/12* (2017.01)
*G06K 9/62* (2006.01)

(52) U.S. Cl.
CPC .............. *G06T 7/0012* (2013.01); *G06T 7/12* (2017.01); *G06K 2209/051* (2013.01); *G06T 2200/04* (2013.01); *G06T 2207/10072* (2013.01); *G06T 2207/10116* (2013.01); *G06T 2207/20096* (2013.01); *G06T 2207/20101* (2013.01); *G06T 2207/30048* (2013.01); *G06T 2210/41* (2013.01)

(58) Field of Classification Search
CPC . G06T 2207/10072; G06T 2207/30048; G06T 2207/20101; G06T 2207/20096; G06T 2207/10116; G06K 9/6204; G06K 9/6254; G06K 2209/051
See application file for complete search history.

(56) References Cited

U.S. PATENT DOCUMENTS

| 8,711,143 | B2 | 4/2014 | Jin et al. | |
|---|---|---|---|---|
| 9,183,630 | B2* | 11/2015 | Luisi | G06T 7/0014 |
| 9,189,886 | B2 | 11/2015 | Black et al. | |
| 9,256,951 | B2 | 2/2016 | Zagorchev et al. | |
| 10,013,767 | B2* | 7/2018 | Chiang | G01B 11/16 |
| 2003/0160786 | A1 | 8/2003 | Johnson | |
| 2008/0205721 | A1 | 8/2008 | Udupa et al. | |
| 2010/0177946 | A1 | 7/2010 | Debruijne et al. | |
| 2012/0249551 | A1 | 10/2012 | Chernoff et al. | |

OTHER PUBLICATIONS

Falcao, A.X. et al., "An ultra-fast user-steered image segmentation paradigm: live wire on the fly" IEEE Transactions on Medical Imaging, vol. 19, Issue 1, pp. 55-62.

Cootes, T.F. et al., "Image and Vision Computing", vol. 12, Issue 6, Jul.-Aug. 1994, pp. 355-365, Information processing in medical imaging.

* cited by examiner

MODEL-BASED SEGMENTATION OF AN ANATOMICAL STRUCTURE

CROSS-REFERENCE TO PRIOR APPLICATIONS

This application is the U.S. National Phase application under 35 U.S.C. § 371 of International Application No. PCT/EP2016/058595, filed on Apr. 19, 2016, which claims the benefit of European Patent Application No. 15164754.2, filed on Apr. 23, 2015. These applications are hereby incorporated by reference herein.

FIELD OF THE INVENTION

The invention relates to a system and a method for performing a model-based segmentation of an anatomical structure in a medical image. The invention further relates to a workstation and imaging apparatus comprising the system and to a computer program product comprising instructions for causing a processor system to perform the method.

BACKGROUND OF THE INVENTION

Robust automatic segmentation of various anatomical structures in a medical image is a key enabler in improving clinical workflows. Here, the term segmentation refers to the identification of the anatomical structure in the medical image, e.g., by delineation of the boundaries of the anatomical structure, by labeling of the voxels enclosed by the boundaries, etc. Once such segmentation has been performed, it is possible to extract clinical parameters such as, in case of, e.g., a cardiac structure, ventricular mass, ejection fraction and wall thickness. When overlaid over, or otherwise applied to the medical image, the segmentation may also provide an annotation of the anatomical structure in the medical image.

It is known to segment an anatomical structure in a medical image manually. For example, a user may, using a graphical user interface, delineate a boundary of the anatomical structure in the medical image. Disadvantageously, such manual segmentation is a time-consuming and thereby cumbersome activity, and ultimately error prone.

It is also known to segment an anatomical structure in a medical image automatically using a model. Such type of segmentation is also referred to as model-based segmentation. The model may be defined by model data. The model data may define a geometry of the anatomical structure, e.g., in the form of a mesh of triangles or a (densely sampled) point cloud. In case of a mesh-based model, inter-patient and inter-disease-stage shape variability may be modeled by assigning an affine transformation to each part of the mesh. Affine transformations cover translation, rotation, scaling along different coordinate axes and shearing. Mesh regularity may be maintained by interpolation of the affine transformations at the transitions between different parts of the model. Such affine transformations are often used as a component in so-termed 'deformable' models.

The fitting of a model to the image data of the medical image may involve an adaptation technique, also termed 'mesh adaptation' in case of a mesh-based model. Such applying is therefore also referred to as 'adapting'. The adaptation technique may optimize an energy function based on an external energy term which adapts the model to the image data and an internal energy term which maintains a rigidness of the model.

Models of the above described type, as well as other types, are known per se, as are various adaptation techniques for the applying of such models to a medical image.

For example, a publication titled "*Automatic Model-based Segmentation of the Heart in CT Images*" by O. Ecabert et al., IEEE Transactions on Medical Imaging 2008, 27(9), pp. 1189-1201, describes a model-based approach for the automatic segmentation of the heart from three-dimensional (3D) Computed Tomography (CT) images.

SUMMARY OF THE INVENTION

Automatic segmentation algorithms may at times produce erroneous segmentation results. In particular, if different models are available for segmenting anatomical structures, automatic algorithms may err in the selection of the model. As such, the segmentation results may be sub-optimal, and thereby of limited or no value in various applications, including but not limited to the extraction of clinical parameters, the use as image annotation, the use as ground truth data in training model-based segmentation, etc.

It would be advantageous to have a system or method for segmentation of an anatomical structure which addresses one or more of the above drawbacks.

The following aspects of the invention involve a user interactively specifying a limited set of boundary points of the anatomical structure in a view of the medical image. The set of boundary points may, on its own, be considered an insufficient segmentation of the anatomical structure in the medical image, but is rather used to select a segmentation model from a plurality of different segmentation models. The selection is based on a goodness-of-fit measure between the boundary points and each of the segmentation models. For example, a best-fitting model may be selected and used for segmentation of the anatomical structure.

A first aspect of the invention provides a system for segmentation of an anatomical structure, comprising:
  an image data interface for accessing image data representing a medical image, the medical image comprising the anatomical structure to be segmented;
  a model data interface for accessing model data defining a plurality of models for segmenting anatomical structures, wherein each of the plurality of models is at least in part representable as a set of coordinates in a coordinate system; and
  a user interaction subsystem comprising:
  i) a display output for displaying a view of the medical image on a display, and
  ii) a user device input for receiving input commands from a user device operable by a user,
  wherein the user interaction subsystem is configured for enabling the user to indicate a set of boundary points of the anatomical structure in the view, thereby obtaining a set of coordinates in a coordinate system associated with the view;
    a processor for selecting one or more of the plurality of models for segmenting the anatomical structure in the medical image by:
  j) determining a goodness-of-fit between the set of boundary points and each of the plurality of models based on a comparison of respective coordinates, thereby obtaining a plurality of goodness-of-fit measures, and
  jj) selecting the one or more of the plurality of models based on the plurality of goodness-of-fit measures, thereby obtaining one or more selected models.

A further aspect of the invention provides a workstation or imaging apparatus comprising the system.

A further aspect of the invention provides a method for segmentation of an anatomical structure, comprising:
  accessing image data representing a medical image, the medical image comprising the anatomical structure to be segmented;
  accessing model data defining a plurality of models for segmenting anatomical structures, wherein each of the plurality of models is at least in part representable as a set of coordinates in a coordinate system; and
  using a user interaction subsystem, enabling the user to indicate a set of boundary points of the anatomical structure in a view of the medical image, thereby obtaining a set of coordinates in a coordinate system associated with the view;
  selecting one or more of the plurality of models for segmenting the anatomical structure in the medical image by:
j) determining a goodness-of-fit between the set of boundary points and each of the plurality of models based on a comparison of respective coordinates, thereby obtaining a plurality of goodness-of-fit measures, and
jj) selecting the one or more of the plurality of models based on the plurality of goodness-of-fit measures, thereby obtaining one or more selected models.

A further aspect of the invention provides a computer program product comprising instructions for causing a processor system to perform the method.

The above measures involve obtaining a medical image. The medical image may be obtained from various imaging modalities, including but not limited to Ultrasound, Computed Tomography (CT), Magnetic Resonance (MR) imaging, etc. Furthermore, model data is provided which defines a plurality of models for segmenting anatomical structures. The models may define a same type of anatomical structure as shown in the medical image. The anatomical structure may be, e.g., an organ, an organ system, a particular part of an organ, etc. As such, the models may be arranged for segmenting a heart, brain, ventricle, etc. However, there may also be models for different anatomical structures. The models may take various forms, including but not limited to mesh models, point cloud models, etc.

The user is enabled to interactively specify a set of boundary points of the anatomical structure in the view. Such a set may be a limited set, in that it may not provide a complete delineation of the anatomical structure in the view. In addition, the view may only show a part of the entire boundary of the anatomical structure. As such, the set of boundary points may, on its own, be considered an insufficient segmentation of the anatomical structure in the medical image. However, the set of boundary points is used to select at least one model for segmenting the anatomical structure. The selection is based on the following: a goodness-of-fit measure is calculated between the user-indicated boundary points and each of the models, and the at least one model is selected based on a comparison of the goodness-of-fits. For example, one or more models may be selected that provide the best goodness-of-fit. The goodness-of-fit measure is based on a comparison of respective coordinates, referring to the comparison of the coordinates of a particular model to those of the set of boundary points. Such a comparison may indicate how well the particular model geometrically fits the set of boundary points, which may then be expressed in as the goodness-of-fit measure.

The above measures have as effect that a user, by way of indicating a limited set of boundary points of the anatomical structure in a view of the medical image, can cause a model to be selected for segmenting the entire anatomical structure. It is therefore not needed for the user to delineate the entire anatomical structure, which would be time consuming and ultimately error prone, nor is it needed for a segmentation algorithm to autonomously have to select a segmentation model, which may yield an erroneous selection. Effectively, the involvement of the user is limited in that he/she only needs to provide a limited set of boundary points which do not serve for the segmentation itself but rather for the selection of a segmentation model for the anatomical structure. By requiring only such limited effort, it is avoided that the user experiences the segmentation as time consuming. In particular, it may suffice for the user to indicate the boundary points in only a limited view of the medical image, e.g., in one or more slice, thereby yielding only a 2D or limited 3D set of boundary points. The inventors have recognized that such a limited set of boundary points may still be effectively matched to, e.g., a 3D model, by way of a suitable goodness-of-fit measure.

Optionally, the processor is configured for fitting the one or more selected models to the anatomical structure in the medical image, thereby obtaining one or more fitted models. The one or more selected models are thus fitted to the anatomical structure in the medical image, thereby providing a segmentation or annotation of the anatomical structure. It is noted that the fitting may be based on the user-indicated boundary points, e.g., by using the boundary points as target points in a registration between the model and the medical image.

Optionally, the processor is configured for, when multiple models are selected and fitted, identifying an area of geometric variation between the multiple fitted models, and the user interaction subsystem is configured for providing visual feedback to the user on a location of the area of geometric variation. This aspect of the invention as claimed relates to the following. The set of boundary points as initially indicated by the user may yield a selection of multiple models. For example, the absolute level and/or relative difference in goodness-of-fit of several models may be insufficient to select only one model. Accordingly, multiple models may be selected and fitted to the medical image. After fitting, there may be an area where the models are in agreement, e.g., by geometrically coinciding. However, there may also be an area where the models are in disagreement, in that there may be a geometric variation between the multiple fitted models. Such a geometric variation may indicate that one or more of the models may be ill-fitting. By providing visual feedback to the user on a location of the area of geometric variation, the user can take this information into account.

Optionally, the user interaction subsystem is configured for enabling the user to adjust, delete and/or add a boundary point from/to the set of boundary points based on the visual feedback, thereby obtaining an adjusted set of boundary points, and the processor is configured for re-selecting one or more of the plurality of models based on the adjusted set of boundary points. The user may, based on the visual feedback on the location of the area of geometric variation, modify the initial set of boundary points, e.g., by adding, deleting or more accurately placing boundary points in the area of geometric variation. This may enable a re-selection of one or more models which better match the particular area and thereby, in case of a selection and fitting of multiple models, yield less geometric variation.

Optionally, the user interaction subsystem is configured for, when providing visual feedback to the user on the location of the area of geometric variation, displaying a further view of the medical image representing the location of the area of geometric variation in the medical image. The area of geometric variation may not, or only sub-optimally, be visible in the initial view of the medical image. By displaying a further view of the medical image which better shows this area, the user is provided with improved visual feedback. Advantageously, when modifying the set of boundary points, the user is not limited to the initial view but can rather add boundary points in, or move them towards, the further view.

Optionally, the processor is configured for selecting the one or more of the plurality of models based on the respective goodness-of-fit measure exceeding a goodness-of-fit threshold. The selection is thus based on thresholding of the goodness-of-fit measures.

Optionally, the processor is configured for, when determining the goodness-of-fit, determining a rigid transformation between the set of boundary points and each of the plurality of models. By determining a rigid transformation between the set of boundary points and each of the plurality of models, each of the models may be brought into alignment with the user-indicated boundary points and thereby with the anatomical structure in the medical image. Since the boundary points are deemed to be reliable, having been indicated by the user and only in a limited quantity, they may serve as reliable target points in the registration with the medical image. Determining a rigid transformation may involve minimizing a distance measure between the set of boundary points and each of the plurality of models. The goodness-of-fit measure may then be defined as a distance measure representing the distance remaining between the boundary points and each model after the rigid transformation.

Optionally, the processor is configured for applying the one or more selected models to the anatomical structure in the medical image based on the respective rigid transformation. The rigid transformation may be used in applying a model to the anatomical structure medical image since it brings the model into alignment with the boundary points.

Optionally, the medical image is a 3D medical image, the view is a 2D representation of the 3D medical image, and the plurality of models are 3D models. The user is thus enabled to specify the boundary points in one or more 2D views, rather than having to specify the boundary points in 3D. This makes specifying boundary points less time consuming.

Optionally, each of the plurality of models is represented at least in part by a surface mesh.

Optionally, the processor is configured for determining the goodness-of-fit based on a point-to-surface matching of the set of boundary points to the respective surface mesh of each of the plurality of models. Point-to-surface matching, also known as point-to-surface registration, is known per se in the art of computer vision and computer graphics, and may be advantageously used in determining the goodness-of-fit for each of the models.

Optionally, the user interaction subsystem is configured for enabling the user to annotate the medical image using the one or more fitted models.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g. to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention are apparent from and will be elucidated with reference to the embodiments described hereinafter. In the drawings.

Figure 1:
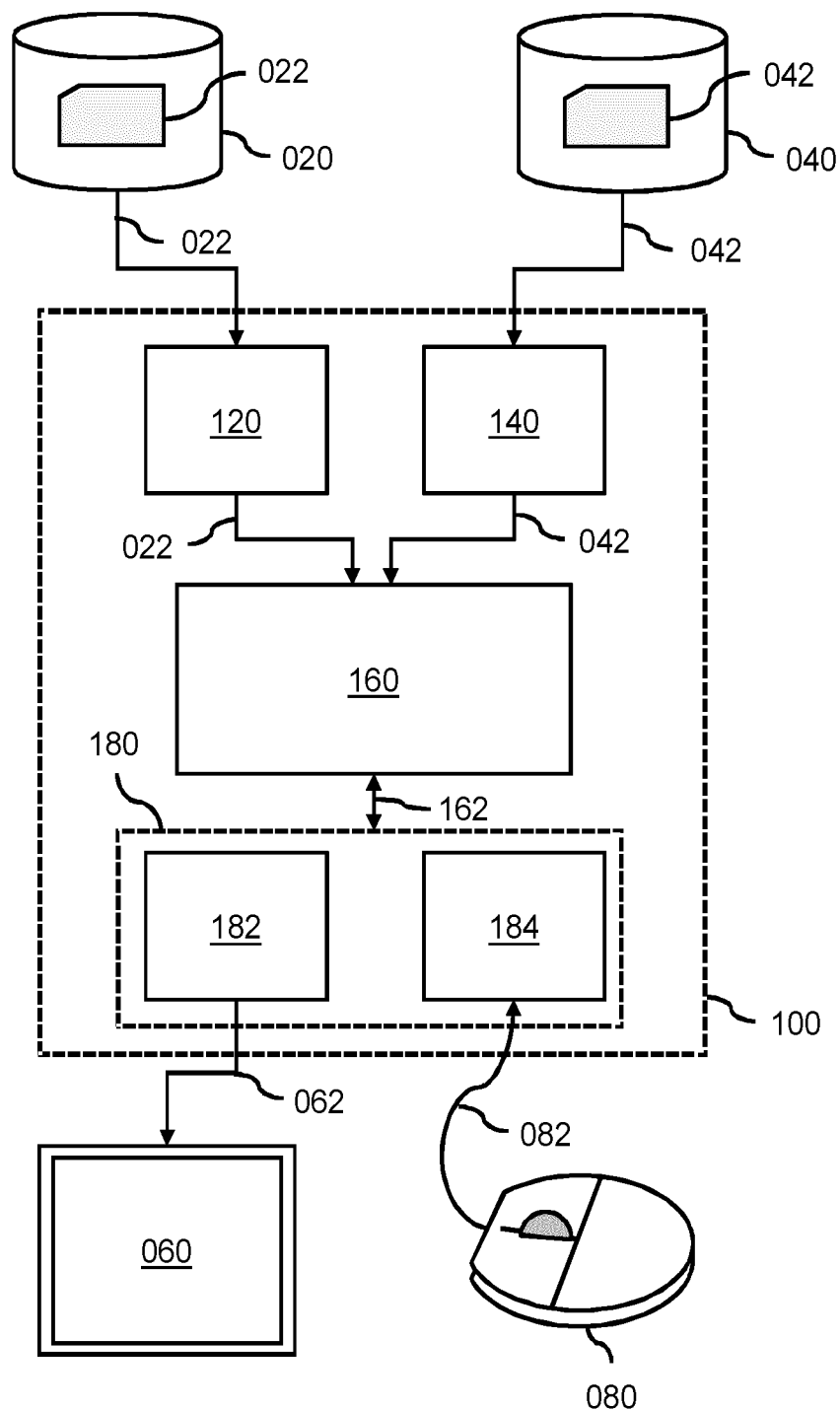
FIG. 1 shows a system for segmentation of an anatomical structure based on a limited set of user-indicated boundary points.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMBERS

The following list of reference numbers is provided for facilitating the interpretation of the drawings and shall not be construed as limiting the claims.

020 image repository
022 image data of medical image
024 view of medical image
030 anatomical structure
040 model database
042 model data
060 display
062 display data
080 user device
082 input commands
100 system for segmentation of anatomical structure
120 image data interface
140 model data interface
160 processor
162 communication to/from user interaction subsystem
180 user interaction subsystem
182 display output
184 user device input
200 first model
210 second model 300 user-indicated boundary points
302, 304 boundary points marked as key points
400 method for segmentation of anatomical structure
410 accessing image data
415 storing of models in database
420 accessing model data
430 obtaining user-indicated boundary points
440 determining goodness-of-fit of models
450 selecting model based on goodness-of-fit
460 computer readable medium
470 instructions stored as non-transient data

DETAILED DESCRIPTION OF EMBODIMENTS

FIG. 1 shows a system 100 for segmentation of an anatomical structure in a medical image based on a limited set of user-indicated boundary points. Such a system may be employed in various medical applications, including, but not limited to, image annotation. The system 100 essentially involves a user interactively specifying the limited set of boundary points of the anatomical structure in a view of the medical image. The set of boundary points may, on its own, be considered an insufficient segmentation of the anatomical structure in the medical image, but is rather used to select a segmentation model from a plurality of different segmentation models. The selection is based on a goodness-of-fit measure between the boundary points and each of the segmentation models. For example, a best-fitting model may be selected and used for segmentation of the anatomical structure.

The system 100 comprises an image data interface 120 for accessing image data 022 of a medical image. The medical image comprises the anatomical structure to be segmented. In the example of FIG. 1, the image data interface 120 is shown to be connected to an external image repository 020. For example, the image repository 020 may be constituted or be part of a Picture Archiving and Communication System (PACS) of a Hospital Information System (HIS) to which the system 100 may be connected or comprised in. Accordingly, the system 100 may obtain access to the image data 022 of the medical image. In general, the image data interface 120 may take various forms, such as a network interface to a local or wide area network, e.g., the Internet, a storage interface to an internal or external data storage, etc.

It is noted that throughout this text and where appropriate, a reference to the medical image is to be understood as a reference to the medical image's image data.

The system 100 further comprises a model data interface 140 for accessing model data 042 defining a plurality of models for segmenting anatomical structures. The model data 142 may define each model in any suitable manner, such as a mesh of triangles, a point cloud, etc. As such, each model may at least in part representable as a set of coordinates in a coordinate system. In the example of FIG. 1, the model data interface 120 is shown to be connected to an external database 040. However, the database 040 may also be an internal database. In general, the database 040 may be constituted by, e.g., a disk-based data storage such as a hard disk, a semiconductor-based data storage such as a ROM or RAM memory, a removable storage medium inserted into a storage medium reader, etc. The model data interface 140 may be of a type which corresponds with that of the database 040.

The system 100 further comprises a user interaction subsystem 180 which comprises a display output 182 and a user device input 184. The display output 182 is configured for displaying visual output of the system 100 on a display 060, which at least includes displaying a view of the medical image. Here, the term 'view' refers to a visualization of a part or all of the medical image. For example, the medical image may be a volumetric 3D image, and the view may be a multi-planar rendering or other volumetric visualization of the volumetric 3D image. Another example is that the medical image may be constituted by a stack of slices, and the view may correspond to one of the slices. Yet another example is that the view is simply a visualization of a 2D medical image. Various other visualizations of a medical image are equally conceivable. To display the view on the display 060, the display output 182 is shown to provide display data 062 to the display.

The user device input 184 is configured for receiving input commands 082 from a user device 080 operable by a user. The user device 080 may take various forms, including but not limited to a computer mouse, touch screen, keyboard, etc. The user device input 184 may be of a type which corresponds to that of the user device 080. Together, the display output 182 and the user device input 184 may form the user interaction subsystem 180 which enables the user to indicate a set of boundary points of the anatomical structure in the view, e.g., by suitably operating the user device 080 to control an onscreen cursor and to 'click on' the boundary of the anatomical structure, thereby specifying the set of boundary points. The boundary points may then be available to the system, e.g., as a set of coordinates.

The system 100 further comprises a processor 160 for selecting one or more of the plurality of models based on the user-indicated set of boundary points. The selected model(s) may then be used for segmenting the anatomical structure in the medical image, e.g., to serve as an annotation of the anatomical structure, for use in further automated analysis, etc. For selecting the model(s), the processor 160 is configured for determining a goodness-of-fit between the set of boundary points and each of the plurality of models based on a comparison of respective coordinates, thereby obtaining a plurality of goodness-of-fit measures, and selecting the one or more of the plurality of models based on the plurality of goodness-of-fit measures, thereby obtaining one or more selected models. For example, the processor 160 may select model(s) of which the goodness-of-fit measure exceeds a threshold. Having selected the model(s), these may then be fitted to the anatomical structure in the medical image, thereby providing one or more segmentations of the anatomical structure.

It is noted that various operations of the system 100, including various optional aspects thereof, will be explained in more detail with reference to FIGS. 3-5.

The system 100 may be embodied as, or in, a single device or apparatus, such as a workstation or imaging apparatus. The device or apparatus may comprise one or more microprocessors which execute appropriate software. The software may have been downloaded and/or stored in a corresponding memory, e.g., a volatile memory such as RAM or a non-volatile memory such as Flash. Alternatively, the functional units of the system may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses. For example, the distribution may be in accordance with a client-server model.

Figure 2:
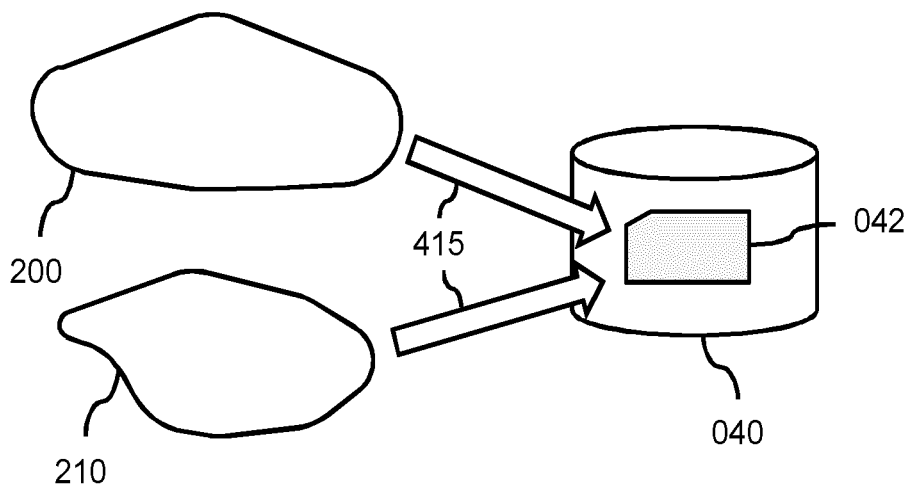
FIG. 2 illustrates a plurality of models stored as model data in a database.

FIG. 2 illustrates a plurality of models stored as model data in a database, in that it shows a first model 200 and a second model 210 being stored 415 as model data 042 in the database 040. The models may take any form which is suitable for segmenting anatomical objects, as are known per se in the art of medical image segments. For example, the models may be mesh models, point cloud models, may be 2D models or 3D models, etc.

Figure 3:
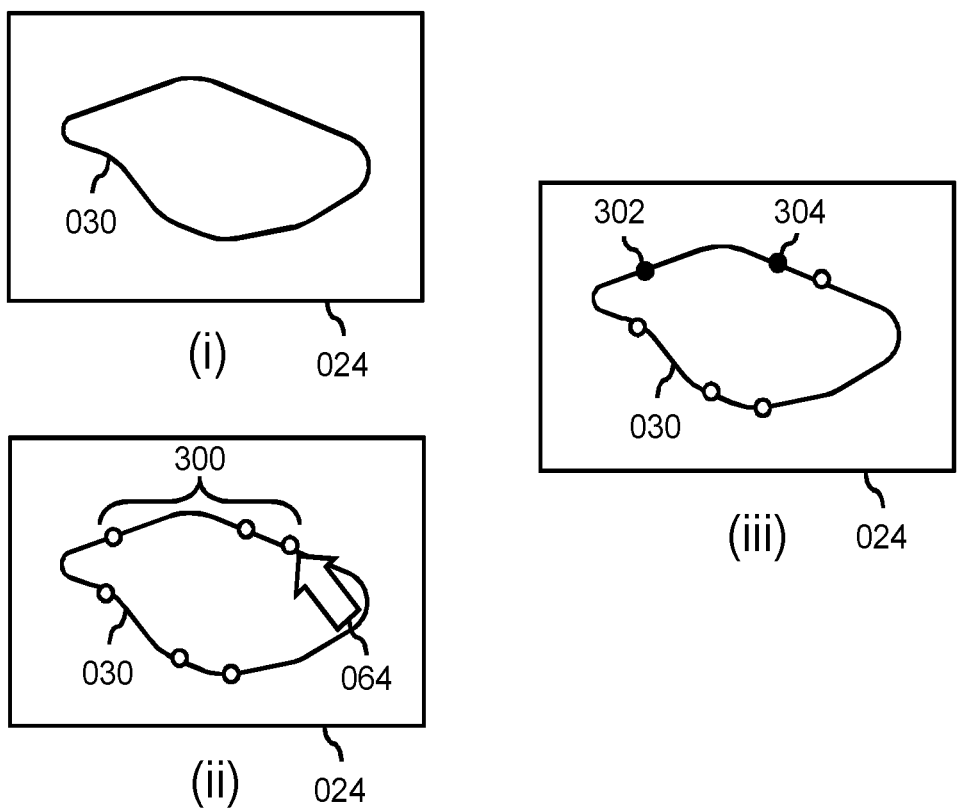
FIG. 3 illustrates the user using a user interaction system to indicate a set of boundary points of the anatomical structure in a view of the medical image.
Figure 4:
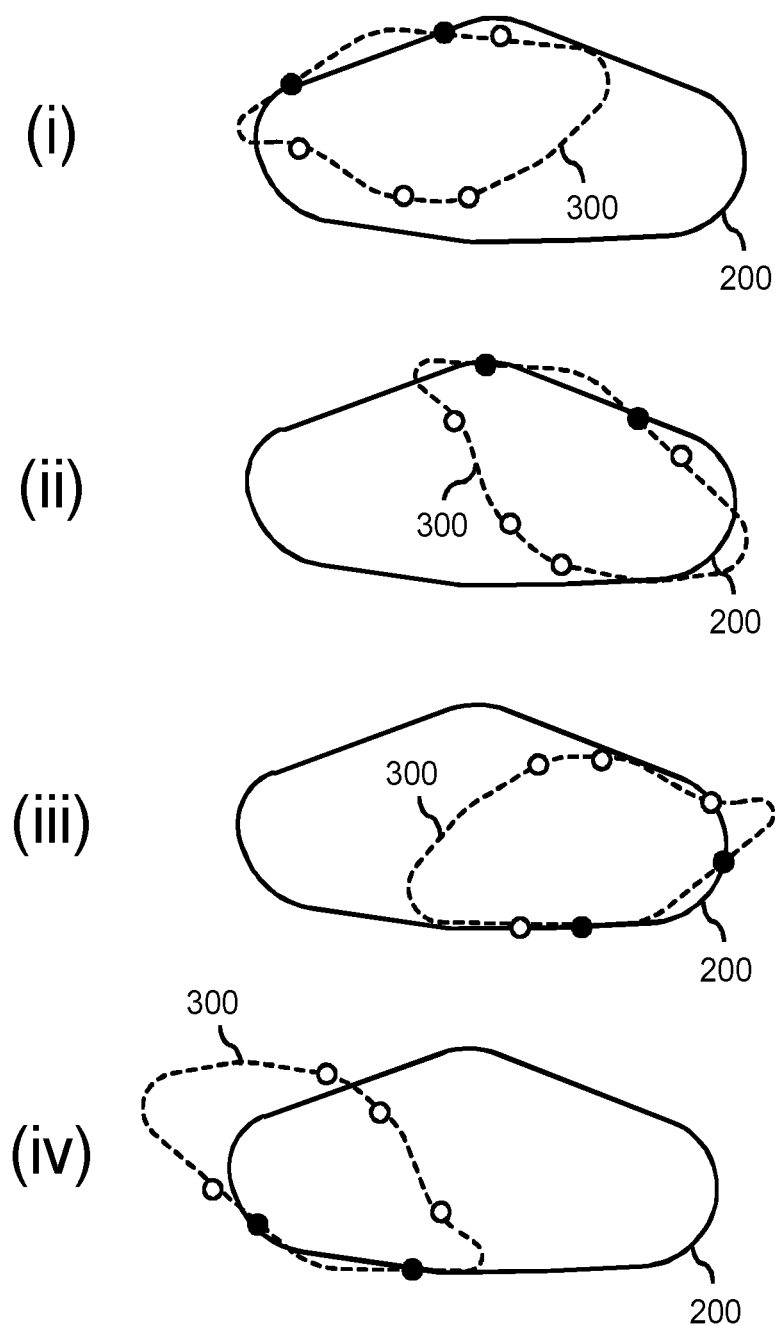
FIG. 4 illustrates a goodness-of-fit being determined between the set of boundary points indicated by the user and a first model from the database.
Figure 5:
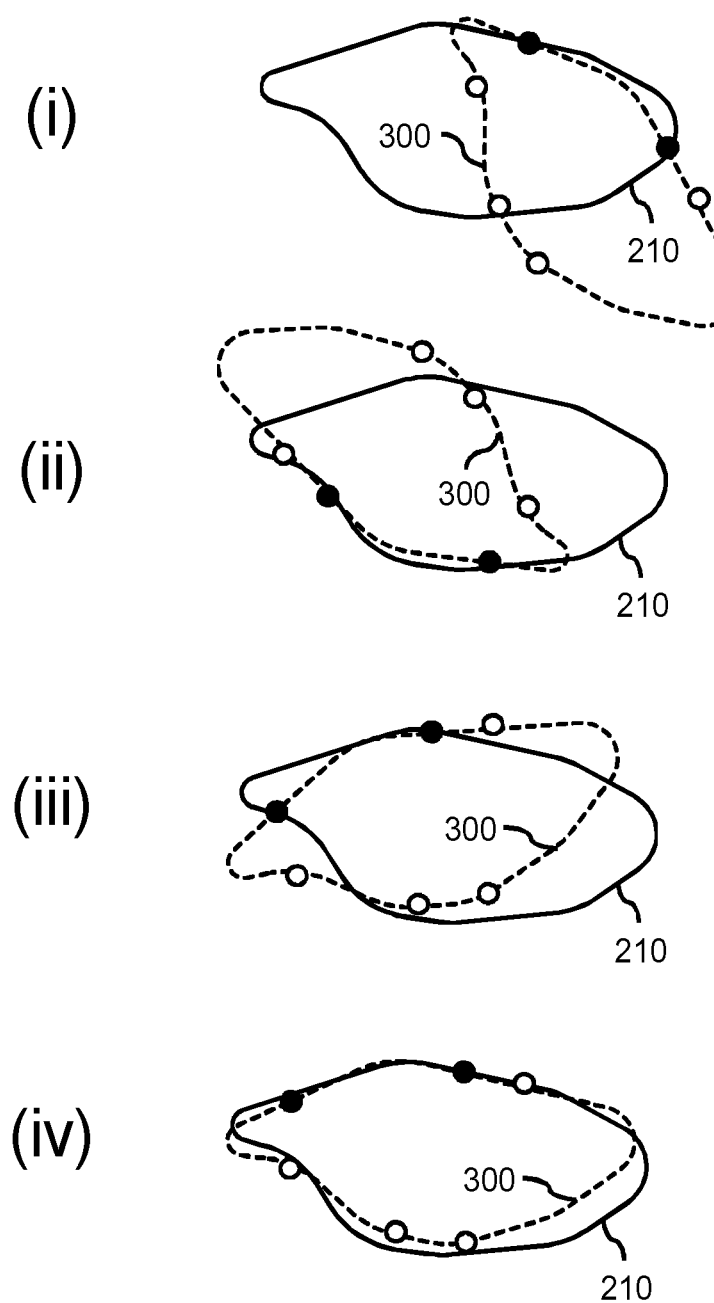
FIG. 5 illustrates a goodness-of-fit being determined between the set of boundary points indicated by the user and a second model from the database, with the second model having a better goodness-of-fit with the boundary points than the first model.

FIGS. 3-5 provide an example of an operation of the system of FIG. 1, with FIG. 3 illustrating the user using a user interaction system to indicate a set of boundary points of the anatomical structure in a view of the medical image. Namely, as shown with reference to sub-FIG. (i), the user may be provided with a view 024 of the medical image on the display, with the view showing at least part of the anatomical structure 030, including at least part of the boundary of the anatomical structure. As shown with reference to sub-FIG. (ii), the user may indicate a set of boundary points 300 on the boundary of the anatomical structure, e.g., b clicking with an onscreen cursor 064 on respective on-screen positions, or via another graphical user interaction. As shown with reference to sub-FIG. (iii), in a specific embodiment, the user may also mark one or more of the boundary points 300 as key points, indicated in sub-FIG. (iii) as black points 302, 304. Such key points 302, 304 may represent boundary points which are deemed to be accurate, e.g., by the user paying special attention to their placement, by the boundary being particularly clearly defined at said points, etc. As an alternative to key points, the user may also specify a 'certainty-of-fit' value for a particular boundary point. However, the user may also refrain from indicating such a certainty, and rather simply indicate a plurality of boundary points without providing 'certainty' input.

As shown in FIG. 3, the user may specify the points relatively evenly distributed along the boundary of the anatomical structure. As will be illustrated with reference to FIGS. 4 and 5, this may facilitate determining a goodness-of-fit between the set of boundary points and a model. It is however not required for the user to specify the points evenly distributed.

FIG. 4 illustrates a goodness-of-fit being determined between the set of boundary points 300 indicated by the user and a first model 200 from the database. It is noted that the outline of the anatomical structure is shown as a dashed line underlying the boundary points 300. However, the outline is merely shown for facilitating the interpretation of FIG. 4, as well as FIG. 5. Namely, at this stage, only the limited set of boundary points may be available to the processor and not (yet) a complete delineation of the anatomical structure.

Sub-FIGS. (i), (ii), (iii) and (iv) illustrate that the boundary points 300 may be mapped to the first model 200 in various ways. Briefly stated, the processor may iteratively determine various geometric transformations between the set of boundary points and a model, select the best one, and consider the goodness-of-fit of this best geometric transformation in subsequently selecting or not selecting the particular model. Such geometric transformations may be, e.g., rigid transformations, constrained elastic transformations, etc. Determining transformations is known per se from various fields, such as image registration, model-to-image registration, mesh registration, etc. As such, in determining a transformation between the set of boundary points and a model, the skilled person may employ a registration techniques from these fields. A simple approach may be an exhaustive approach, in that all possible transformations may be evaluated. Such an approach may be constrained by an additional requirement, in that the key points (marked as black) may be required to be mapped onto the surface of the first model 200. Subsequently, a goodness-of-fit may be calculated based on a distance measure applied to the remaining non-key boundary points. As can be seen throughout sub-FIGS. (i)-(iv), the various geometric transformations generally yield a poor goodness-of-fit. The geometric transformation illustrated in sub-FIG. (iii) may still be considered a best fit, and therefore its goodness-of-fit may be considered in the subsequent selecting or not selecting of the first model 200.

FIG. 5 illustrates a goodness-of-fit being determined between the same set of boundary points 300 as shown in FIG. 4, but now with respect to a second model 210 from the database. As can be seen in FIG. 5, and in particular in sub-FIG. (iv), the second model 210 generally better matches the set of boundary points 300. The geometric transformation illustrated in sub-FIG. (iv) may be considered a best fit, and therefore its goodness-of-fit may be considered in subsequently selecting or not selecting of the second model 210.

Having determined the goodness-of-fit of the first model 200 and the second model 210, and possibly of other models, one or more of the models may be selected based on their respective goodness-of-fit measures. For example, the processor may select the second model 210 based on its goodness-of-fit measure exceeding that of the first model 200. The processor may also select both the first model 200 and the second model 210 based on their respective goodness-of-fit measures both exceeding a goodness-of-fit threshold.

In general, having selected multiple models based on their goodness-of-fit, the system may iteratively improve on the selection in the following manner. Namely, the selected models may be fit to the medical image, e.g., using the rigid transformation as previously determined. Subsequently, an area of geometric variation between the multiple fitted models may be identified. This may, for example, involve determining for each point of the best matching model the closest point to each of the other selected models, and then computing the mean distance between said points. The user interaction subsystem may then provide visual feedback to the user on a location of the area of geometric variation. Such visual feedback may include displaying a further view of the medical image which optimally shows the area of geometric variation, and visually highlighting said area, e.g., by means of a colored sphere or other visualization means. The user may be enabled to adjust the set of boundary points based on the visual feedback, for example, by adjusting, deleting and/or adding one or more boundary point from/to the set of boundary points. Subsequently, processor may re-select one or more of the plurality of models based on the adjusted set of boundary points. Accordingly, the system may iteratively improve the model selection with aid of the user, e.g., by iteratively 'narrowing-down' to a selection of a best fitting model.

It is noted that determining a transformation between the set of boundary points and a model may involve point-to-surface matching, e.g., using an iterative closest points algorithm. Here, for each user-specified boundary point, the closest point of the model may be determined, e.g., via full search, geometric hashing or a distance transform. Then, the parameters of a rigid transformation may be determined which minimizes the distance between all user-specified boundary points and corresponding closest model point. The goodness-of-fit measure may then be the remaining, i.e., 'final', point-surface error.

It will be appreciated that the invention as claims may be advantageously used to select a 3D model based on the user specifying boundary points in a 2D view of a 3D medical image. However, this is not a limitation in that also a 3D model may be selected based on the user specifying boundary points in a 3D view, or in multiple 2D views, or that a 2D model may be selected based on the user specifying boundary points in a 2D view, etc.

It is further noted that, in addition to user-specified boundary points, also one or more computer-generated boundary points may be used in determining the goodness-of-fit with each of the plurality of models. The computer-generated boundary points make be algorithmically generated from or based on the user-specified boundary points, and may effectively be used to augment the user-specified boundary points, thereby obtaining an augmented set of boundary points to be used in determining the goodness-of-fit with each of the plurality of models. For example, an algorithm termed 'live wire' may be used to generate to add further points to the set of user-specified boundary points, as described in a paper titled '*An ultra fast user-steered image segmentation paradigm: live wire on the fly*' by Falcao, A. X. et al, in IEEE Transactions on Medical Imaging, Vol. 19, Issue 1, pp. 55-62. As input to said live wire algorithm, as well as in general, the user-specified boundary points may be specified in the form of line segments or other geometrical primitives.

An example use case may be the following. Here, a model is selected for the purpose of annotation of an anatomical structure in a medical image. A user may provide initial information in the form of specified coordinates in a 2D view. These coordinates may effectively represent a user-specified 2D model of the anatomical structure. These coordinates may be used to query a database of pre-defined 3D models. A 3D model with the closest similarity to the manually entered coordinates may be imported into the annotation software and aligned to the medical image in accordance with the best fit to the manually entered coordinates. In assessing the fit of the 3D model to the medical image, if the fit is below a threshold, the user may be asked to add coordinates to the 2D model such that an alternative 3D model is fitted to the medical image. If the fit of the 3D model is above the threshold, the medical image may then be annotated using the selected 3D model.

Figure 6:
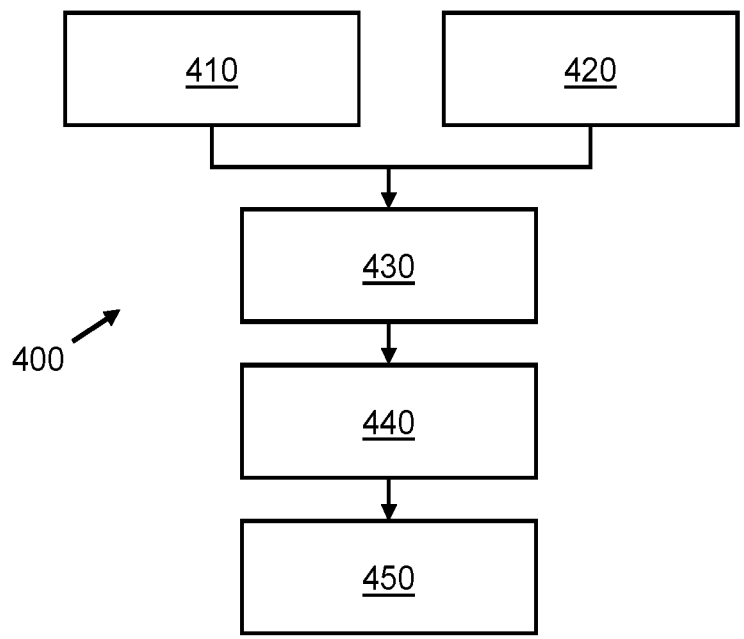
FIG. 6 shows a method for segmentation of an anatomical structure based on a limited set of user-indicated boundary points.

FIG. 6 shows a method 400 for segmentation of an anatomical structure based on a limited set of user-indicated boundary points. The method 400 comprises, in an operation titled "ACCESSING IMAGE DATA", accessing 410 image data representing a medical image, the medical image comprising the anatomical structure to be segmented. The method 400 further comprises, in an operation titled "ACCESSING MODEL DATA", accessing 420 model data defining a plurality of models for segmenting anatomical structures, wherein each of the plurality of models is at least in part representable as a set of coordinates in a coordinate system. The method 400 further comprises, in an operation titled "OBTAINING USER-INDICATED BOUNDARY POINTS", using a user interaction subsystem, enabling the user to indicate a set of boundary points of the anatomical structure in a view of the medical image, thereby obtaining 430 a set of coordinates in a coordinate system associated with the view. The method 400 further comprises selecting one or more of the plurality of models for segmenting the anatomical structure in the medical image by, in an operation titled "DETERMINING GOODNESS-OF-FIT OF MODELS", determining 440 a goodness-of-fit between the set of boundary points and each of the plurality of models based on a comparison of respective coordinates, thereby obtaining a plurality of goodness-of-fit measures, and in an operation titled "SELECTING MODEL BASED ON GOODNESS-OF-FIT", selecting 450 the one or more of the plurality of models based on the plurality of goodness-of-fit measures, thereby obtaining one or more selected models.

It will be appreciated that the above operation may be performed in any suitable order, e.g., consecutively, simultaneously, or a combination thereof, subject to, where applicable, a particular order being necessitated, e.g., by input/output relations.

Figure 7:
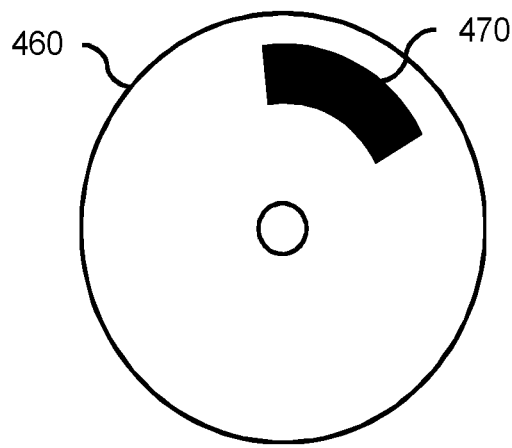
FIG. 7 shows a computer readable medium comprising instructions for causing a processor system to perform the method.

The method 400 may be implemented on a computer as a computer implemented method, as dedicated hardware, or as a combination of both. As also illustrated in FIG. 7, instructions for the computer, e.g., executable code, may be stored on a computer readable medium 460, e.g., in the form of a series 470 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 460.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for segmentation of an anatomical structure, comprising:
   an image data interface for accessing image data representing a medical image, the medical image comprising the anatomical structure to be segmented;
   a model data interface for accessing model data defining a plurality of models for segmenting anatomical structures, wherein each of the plurality of models is at least in part representable as a set of coordinates in a coordinate system;
   a user interaction subsystem comprising:
      i) a display output for displaying a view of the medical image on a display,
      ii) a user device input for receiving input commands from a user device operable by a user,
   wherein the user interaction subsystem is configured for enabling the user to indicate a set of boundary points of the anatomical structure in the view, thereby obtaining a set of coordinates in a coordinate system associated with the view; and
      a processor for selecting one or more of the plurality of models for segmenting the anatomical structure in the medical image by:
         j) determining a goodness-of-fit between the set of boundary points and each of the plurality of models based on a comparison of respective coordinates, thereby obtaining a plurality of goodness-of-fit measures,
         jj) selecting the one or more of the plurality of models based on the plurality of goodness-of-fit measures, thereby obtaining one or more selected models,
         jjj) fitting the one or more selected models to the anatomical structure in the medical image, thereby obtaining one or more fitted models, and
         jv) when multiple models are selected and fitted, identifying an area of geometric variation between the multiple fitted models,
            wherein the user interaction subsystem is further configured for providing visual feedback to the user on a location of the area of geometric variation.

2. The system according to claim 1, wherein:
   the user interaction subsystem is configured for enabling the user to adjust, delete and/or add a boundary point from/to the set of boundary points based on the visual feedback, thereby obtaining an adjusted set of boundary points, and
   the processor is configured for re-selecting one or more of the plurality of models based on the adjusted set of boundary points.

3. The system according to claim 1, wherein the user interaction subsystem is configured for, when providing visual feedback to the user on the location of the area of geometric variation, displaying a further view of the medical image representing the location of the area of geometric variation in the medical image.

4. The system according to claim 1, wherein the processor (160) is configured for selecting the one or more of the plurality of models based on the respective goodness-of-fit measure exceeding a goodness-of-fit threshold.

5. The system according to claim 1, wherein the processor is configured for, when determining the goodness-of-fit, determining a rigid transformation between the set of boundary points and each of the plurality of models.

6. The system according to claim 5, wherein the processor is configured for applying the one or more selected models to the anatomical structure in the medical image based on the respective rigid transformation.

7. The system according to claim 1, wherein:
   the medical image is a 3D medical image,
   the view is a 2D representation of the 3D medical image, and
   the plurality of models are 3D models.

8. The system according to claim 1, wherein each of the plurality of models is represented at least in part by a surface mesh.

9. The system according to claim 8, wherein the processor is configured for determining the goodness-of-fit based on a point-to-surface matching of the set of boundary points to the respective surface mesh of each of the plurality of models.

10. The system according to claim 1, wherein the user interaction subsystem is configured for enabling the user to annotate the medical image using the one or more fitted models.

11. A workstation or imaging apparatus comprising the system according to claim 1.

12. A method for segmentation of an anatomical structure, comprising:
   accessing image data representing a medical image, the medical image comprising the anatomical structure to be segmented;
   accessing model data defining a plurality of models for segmenting anatomical structures, wherein each of the plurality of models is at least in part representable as a set of coordinates in a coordinate system;
   using a user interaction subsystem, enabling the user to indicate a set of boundary points of the anatomical structure in a view of the medical image, thereby obtaining a set of coordinates in a coordinate system associated with the view; and
   selecting one or more of the plurality of models for segmenting the anatomical structure in the medical image by:
      j) determining a goodness-of-fit between the set of boundary points and each of the plurality of models based on a comparison of respective coordinates, thereby obtaining a plurality of goodness-of-fit measures, jj) selecting the one or more of the plurality of models based on the plurality of goodness-of-fit measures, thereby obtaining one or more selected models, jjj) fitting the one or more selected models to the anatomical structure in the medical image, thereby obtaining one or more fitted models, and jv) when multiple models are selected and fitted, identifying an area of geometric variation between the multiple fitted models, wherein the user interaction subsystem is further configured for providing visual feedback to the user on a location of the area of geometric variation.

13. A computer program product comprising instructions for causing a processor system to perform the method according to claim 12.

\* \* \* \* \*